US009846820B2

(12) United States Patent
Hunag

(10) Patent No.: US 9,846,820 B2
(45) Date of Patent: Dec. 19, 2017

(54) METHOD AND SYSTEM FOR CODING OR RECOGNIZING OF SURVEILLANCE VIDEOS

(71) Applicant: Tiejun Hunag, Beijing (CN)

(72) Inventor: Tiejun Hunag, Beijing (CN)

(*) Notice: Subject to any disclaimer, the term of this patent is extended or adjusted under 35 U.S.C. 154(b) by 288 days.

(21) Appl. No.: 14/485,678

(22) Filed: Sep. 13, 2014

(65) Prior Publication Data
US 2015/0078444 A1   Mar. 19, 2015

(30) Foreign Application Priority Data
Sep. 13, 2013   (CN) .......................... 2013 1 04181800

(51) Int. Cl.
| | |
|---|---|
| H04N 7/18 | (2006.01) |
| H04N 7/12 | (2006.01) |
| H04N 11/02 | (2006.01) |
| H04N 11/04 | (2006.01) |
| G06K 9/62 | (2006.01) |
| H04N 19/23 | (2014.01) |

(52) U.S. Cl.
CPC ............ *G06K 9/6262* (2013.01); *H04N 19/23* (2014.11)

(58) Field of Classification Search
CPC ....................... H04N 19/61; G06T 2207/20144
See application file for complete search history.

(56) References Cited

U.S. PATENT DOCUMENTS

| | | | | |
|---|---|---|---|---|
| 6,526,171 | B1 * | 2/2003 | Furukawa | ........ H04N 21/23892 |
| | | | | 375/E7.018 |
| 7,283,672 | B1 * | 10/2007 | Harris | ..................... H04N 19/27 |
| | | | | 375/E7.077 |
| 2001/0036319 | A1 * | 11/2001 | Sakaida | .................. H04N 19/23 |
| | | | | 382/232 |
| 2004/0008773 | A1 * | 1/2004 | Itokawa | ................ G01S 3/7864 |
| | | | | 375/240.08 |
| 2006/0239645 | A1 * | 10/2006 | Curtner | ............... G06F 17/3079 |
| | | | | 386/228 |
| 2008/0124045 | A1 * | 5/2008 | Chung | .............. G06F 17/30256 |
| | | | | 386/239 |
| 2009/0154565 | A1 * | 6/2009 | Jeong | ................... H04N 19/503 |
| | | | | 375/240.16 |
| 2009/0290020 | A1 * | 11/2009 | McLeish | ............ G06K 9/00771 |
| | | | | 348/143 |

(Continued)

OTHER PUBLICATIONS

Yaqi Chu ; Xiaotian Wu ; Tong Liu ; Jun Liu; A basis-background subtraction method using non-negative matrix factorization. Proc. SPIE 7546, Second International Conference on Digital Image Processing, 75461A (Feb. 26, 2010); doi:10.1117/12.853445.*

*Primary Examiner* — Joseph Ustaris
*Assistant Examiner* — Rebecca Volentine
(74) *Attorney, Agent, or Firm* — Flener IP Law, LLC

(57) ABSTRACT

Method for coding or recognizing of surveillance videos is provided to improve compressing efficiency and recognizing accuracy of surveillance videos. The method for coding surveillance videos includes: establishing a background database and a foreground object database; wherein, the background database includes a set of background images; the foreground object database includes a set of foreground objects; coding a surveillance image by referring to a background image in the background database and a foreground object in the foreground object database.

16 Claims, 6 Drawing Sheets

(56) References Cited

U.S. PATENT DOCUMENTS

| | | | |
|---|---|---|---|
| 2009/0322881 A1* | 12/2009 | Shu | G06F 17/3079 |
| | | | 348/148 |
| 2010/0124358 A1* | 5/2010 | Huang | G06K 9/00342 |
| | | | 382/103 |
| 2012/0257053 A1* | 10/2012 | Gupta | H04N 7/181 |
| | | | 348/143 |
| 2013/0170557 A1* | 7/2013 | Wang | H04N 19/00 |
| | | | 375/240.24 |

* cited by examiner

A background database and a foreground object database are established; wherein, the background database includes a set of background image set; the foreground object database includes a set of foreground object;     201

A surveillance image is coded by referring to the background database and the foreground object database.     202

Fig.2

A background database and a foreground object database are respectively decoded, or a background image and a foreground object cited by a surveillance image are decoded; — 501

THe monitoring image is decoded by referring to the decoded background image and foreground object cited; — 502

Description information of the background image, foreground object and behavior data of the foreground object is retrieved from the decoding process, and substituted into a preset semantic expression format to form a semantic expression. — 503

Fig.5

Low-level features and semantic information are effectively expressed and described, wherein, a basic index object includes space-time diagrams, elements and events or objects extracted;     601

A video abstract is generated;     602

A description framework of the index layer is established. All the description information is constructed into syntactic structures of different levels of the video stream.     603

Fig. 6

METHOD AND SYSTEM FOR CODING OR RECOGNIZING OF SURVEILLANCE VIDEOS

CROSS-REFERENCE TO RELATED APPLICATION

This application claims priority from CN Patent Application Ser. No. 2013104181800, filed on Sep. 13, 2013, the entire contents of which are incorporated herein by reference for all purposes.

FIELD OF THE INVENTION

The present invention is related to video surveillance technology, especially related to method and system, for coding or recognizing of surveillance videos.

BACKGROUND OF THE INVENTION

Along with the development of digital video and computing technologies, video surveillance systems have been widely deployed in security fields such as buildings, constructions, traffic, etc., and can be deployed in a larger-scale according to actual security requirements. Thus the video surveillance system has played a more vital role in the security systems.

The prior video surveillance system includes a surveillance video capturing side and a monitoring side. Wherein, videos in the monitoring area are real-timely captured at the capturing side via video monitoring equipment such as stationary cameras or PTZ cameras, and then the captured surveillance video is compressed and sent to the monitoring side. The compressed surveillance video is decompressed and displayed on a video screen at the monitoring side. Then the monitoring area is real-timely monitored through the video screen.

Therefore, at the monitoring side, the surveillance video has to be decoded before being recognized, however, the decoding process is really a waste of time. What's more, the surveillance video decoded would lose high frequency information and is consequently distorted during the decoding process, so that it is not good enough to be used in the subsequent processing steps.

In addition, in prior video surveillance systems, video clips are used as units for analysis and recognition (to achieve universal property, the video scene is not assumed to be known). In this case, the video surveillance system has to recognize objects and relations of objects from the surveillance video of an unfamiliar environment. Thus the recognizing process is very difficult.

At the same time, in the prior video surveillance systems, some operations, such as monitoring of multi-channel videos or surveying after accidents, are still done artificially. Moreover, a round-the-clock video surveillance system will occupy a very large part of storage space, and the workload of real-time monitoring is huge. In this case, monitoring personals are easily fatigued, which will result in low work efficiency and high missing risks of the monitoring process.

SUMMARY OF THE INVENTION

A method and a system for coding or recognizing of surveillance videos are provided by the present invention to improve compressing efficiency and recognizing accuracy of surveillance videos.

A method for coding surveillance videos provided by the present invention includes:

establishing a background database and a foreground object database; wherein, the background database comprises a set of background images; the foreground object database comprises a set of foreground objects;

coding a surveillance image by referring to a background image in the background database and a foreground object in the foreground object database.

A method for recognizing surveillance videos, adapted to decode video streams obtained, is provided in embodiment of the present invention, wherein, the video streams are obtained by any method for coding surveillance videos provided by embodiments of the present invention. The method includes:

decoding a background image and a foreground object cited by a surveillance image:

decoding the surveillance image by referring to the decoded background image and the foreground object cited.

A system for coding surveillance videos includes:

a database establishing module, adapted to establish a background database and a foreground object database; wherein, the background database includes a set of background images; the foreground object database includes a set of foreground objects;

a coding module, adapted to code a surveillance image by referring to a background image in the background database and a foreground object in the foreground object database.

In an embodiment of the present invention, a foreground object database and a background database are established; the surveillance image is captured and coded by referring to a foreground object in the foreground object database and a background image in the background database. After a surveillance image is captured, a foreground, object is obtained from the foreground object database and a background image is obtained from the background database; then serial numbers of the foreground object and the background image are obtained, and the serial numbers are coded instead. Therefore, the surveillance image can be directly analyzed, decoded and extracted at a monitoring side according to the foreground object and background image cited by the surveillance image, and compressing and decompressing of the surveillance image are avoided. At the same time, the monitoring side can comprehend the surveillance image according to semantic description of the surveillance image without thoroughly reviewing the surveillance image. Therefore, by using the technical scheme of the present invention, monitoring accuracy is improved and cost of the whole video surveillance system is reduced.

BRIEF DESCRIPTION OF THE DRAWINGS

To give a further description of the embodiments in the present invention or the prior art, the appended drawings used to describe the embodiments and the prior art are introduced as follows. Obviously, the appended drawings described here are only used to explain the embodiments of the present invention. Those skilled in the art can understand that other appended drawings may be obtained according to these appended drawings without creative work.

FIG. 2 illustrates a flow chart of a method for coding surveillance videos.

FIG. 5 illustrates a flow chart of a method for recognizing surveillance videos.

FIG. 6 illustrates a flow chart of a method for searching indexes of videos.

DETAILED DESCRIPTION OF THE INVENTION

Figure 1:
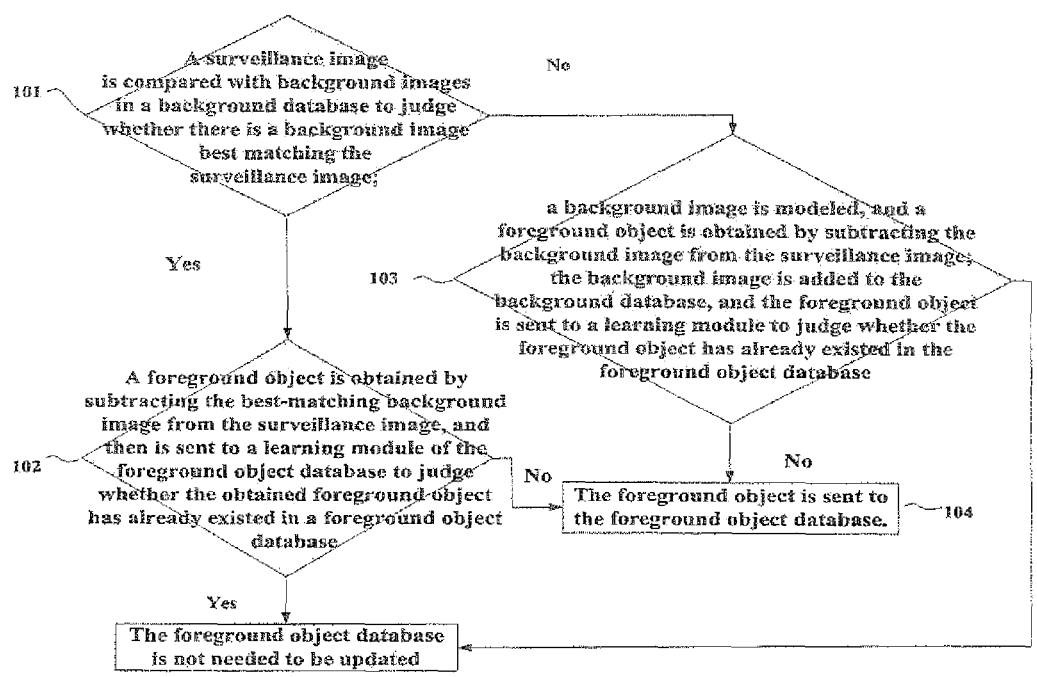
FIG. 1 illustrates a flow chart of a method for establishing a background database and a foreground object database.

The embodiments of the present invention, are described more fully hereinafter with reference to the accompanying drawings, which form a part hereof and winch show, by way of illustration, specific exemplary embodiments by which the invention may be practiced. This invention may, however, be embodied in many different forms and should not be construed as limited to the embodiments set forth herein; rather, these embodiments are provided so that this disclosure will be through and complete, and will fully convey the scope of the invention to those skilled in the art. Among other things, the present invention may be embodied as systems, methods or devices. The following detailed description should not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment although it may. Thus, as described below, various embodiments of the invention may be readily combined, without departing from the scope or spirit of the invention.

In addition, as used herein, the term, "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on". The term "coupled" implies that the elements may be directly connected together or may be coupled through one or more intervening elements. Further reference may be made to an embodiment where a component is implemented and multiple like or identical components are implemented.

While the embodiments make reference to certain events this is not intended to be a limitation of the embodiments of the present invention and such is equally applicable to any event where goods or services are offered to a consumer.

Further, the order of the steps in the present embodiment is exemplary and is not intended to be a limitation on the embodiments of the present invention. It is contemplated that the present invention includes the process being practiced in other orders and/or with intermediary steps and/or processes.

Those skilled in the art can understand that, a surveillance video is consisted by continuous surveillance images. The limitation "video stream" in the present invention refers to the code bit stream of surveillance images sequence.

In an embodiment of the present invention, different scenes in a monitoring area are captured at a capturing side to obtain surveillance images, and a foreground object and a background image of a surveillance image are separated and respectively coded; then the foreground object and the background image are separately represented in a video stream. Herein, the foreground object is relatively independent data areas of the coded video stream, so objects could be detected, analyzed and recognized directly based on the data area of the foreground object, and the data area of the background image will not "interfere" the object detection and segmentation, but further assist the detection and recognition of the foreground object. Therefore in subsequent recognizing processes, the background image and the "roughly accurate" foreground object can be obtained directly from a surveillance image of the surveillance video.

FIG. 1 illustrates a flow chart of a method for establishing a background database and a foreground object database in a process of coding a surveillance video. As shown in FIG. 1, the method includes:

Step 101: a surveillance image is compared with background images in a background database to judge whether there is a background image in the background database best matching the surveillance image; if there is, continue with Step 102; or, continue with Step 103.

In an embodiment of the present invention, similarity values between the surveillance image and each background image in the background database are calculated respectively (part areas of the surveillance image, which are very different from the background images, are considered as foreground objects and are not used for calculating). When the ratio of the largest similarity value to the second largest similarity value is larger than a threshold, the background image corresponding to the largest similarity value is considered as the best matching background image; or, it determines that the best matching background image is not found.

The reason for using the ratio of the largest similarity value to the second largest similarity value to determine the best matching background image is avoiding following situation: in same case, none of background image in the background database really matches the monitor image, however, mistake would happen if the best-matching background image is considered as an image only corresponding to the largest similarity value.

Step 102: a foreground object is obtained by subtracting the best-matching background image from the surveillance image, and then is sent to a learning module of the foreground object database to judge whether the obtained foreground object has already existed in a foreground object database. If the obtained foreground object has existed in a foreground object database, the foreground object database is not needed to be updated; or, continue with Step 104.

Step 103: a background image is modeled through a background modeling method, and a foreground object is obtained by subtracting the background, image from the surveillance image; the background image is added to the background database, and the foreground object is sent to a learning module of the foreground object database to judge whether the foreground object obtained has already existed in the foreground object database; if the foreground object obtained has existed in a foreground object database, it need not to updated the foreground object database; or, continue with Step 104;

Step 104: the foreground object is added to the foreground object database.

In an embodiment of the present invention, surveillance video of a static scene in a monitoring area are captured, wherein, the static scene may include scenes of fixed buildings or static buildings in the surveillance area, such as: walls, doors, corridors, ceilings, etc. The surveillance video is split to many single frame images and then each single frame image is respectively coded; finally, a background database including these single frame images and their corresponding code is established.

FIG. 2 illustrates a flow chart of a method for coding surveillance videos. As shown in FIG. 2, the method includes:

Step 201: a background database and a foreground object database are established; wherein, the background database includes a set of background images; the foreground object database includes a set of foreground objects.

Continuous background images are obtained according to continuous surveillance images and stored in the background image set (the background database); when a current background image is greatly changed, a second background image is formed and stored in the background database until each background image of the continuous surveillance images is stored in the background database.

In an embodiment of the present invention, a foreground object is retrieved and sent to a learning module of a foreground object database to judge whether the foreground object has already existed in the foreground object database. If the foreground object obtained has existed in a foreground object database, it need not to update the foreground object database; or, the foreground object is sent to the foreground object database.

In an embodiment of the present invention, a background database and a foreground object database are established by the method shown in the FIG. 1.

Step 202: a surveillance image is coded by referring to the background database and the foreground object database.

Specifically, the surveillance image is compared with background images in the background database. When a background image best-matching the surveillance image is found in the background database, the surveillance image is coded by referring to the best-matching background image in the background database; or, the background database and the foreground object database are updated according to the surveillance image, and the surveillance image is coded by referring to the updated background database.

By using the coding method of the embodiment of the present invention, through image analysis (background analysis and foreground object analysis), coding and recognizing of a surveillance video are uniformly implemented in a framework; the background analysis is used to improve coding efficiency, and the foreground object analysis is used to recognize and comprehend the object.

In an embodiment of the present invention, background images in a background database are modeled through a modeling process based on original uncompressed images at the capturing side.

In the real world, background is continuously changing; however, the changing of background is relatively slower than that of foreground. These changes include short-term cyclical changes (for example, waggling trees and swaying flags in the background), day-night cyclical changes (such as sunlight changes and shadow shifts), season changes (such as grass color changes) and occasional climates (rain, snow, fog, haze, etc.). The easiest way for modeling these changes is to establish a background database including backgrounds under various typical scenes, and illustrate possible changes in parameters of background images. By establishing such a background database, surveillance and recognizing of foreground objects will be much easier.

In some case, the background database or the foreground object database may be an empty set. In this situation, the surveillance image may be coded by only referring to the background database or the foreground object database, which is still included in the scope of the present invention.

In an embodiment of the present invention, different capturing periods may be set during monitoring capturing, images of a monitoring area are captured at different periods and the images captured are coded according to their different capturing time to establish a background database. Specifically, the capturing period may be 12 hours, 24 hours and so on. In above steps, after a 24 hour video of a static scene is captured, the video may be split according to different capturing time. For example, a 24 hours video may be split into 24 units if considering 1 hour as a unit. After multiple frame images are obtained, each frame image is sequentially coded in accordance with its capturing time. Finally, a background database is established by respectively coding the 24 sets of frame images of the static scene. In this situation, "capturing time" information may be stored individually as a description parameter of a frame image. For example, in a line corresponding to a frame image code, a column may be added to record its "capturing time" information.

In an embodiment of the present invention, background images may be obtained by capturing the monitoring area from different capturing angles. In this situation, "capturing angle" information may be stored individually as a description parameter of a frame image. For example, in a line corresponding to a frame image code, a column may be added to record its "capturing angle" information.

In an embodiment of the present invention, background images captured from different angles may be combined to form a panoramic image that represents a "wide-angle panoramic" scene, and then the panoramic image is coded. Then a panoramic background image of the "wide-angle panoramic" scene is obtained. In this case, when a foreground object continuously appears in more than one monitoring area, continuously monitoring of the foreground object will be easy, so that monitoring accuracy is improved and monitoring blind angles are avoided.

In an embodiment of the present invention, a background database may include background images of a certain scene which are captured at different time and/or in different seasons and/or in different weathers and/or from different capturing angles.

As mentioned above, better background models may be obtained by using statistical methods (even including time, place or other external information statistics) based on a long-time video sequence, and once the background model currently used is known, monitoring and recognizing of foreground objects will be more accurate.

In an embodiment of the present invention, a background database may be stored by a database or other data storage methods.

In an embodiment of the present invention, a foreground object database may also be modeled. For example, buses always appear in a monitoring area in a day and some criminals may appear in the same monitoring area several times as well when they are casing. Then foreground objects, such as the criminals, buses, can be found in the surveillance video through repeated detecting techniques and machine learning methods, to form a foreground object database.

In an embodiment of the present invention, information of foreground areas, such as positions, motion vectors, contours, deformations and interaction relationships, may also be included in a foreground object database. The foreground areas are considered as foreground objects, and description information of the foreground objects may be included in the foreground object database as well.

In an embodiment of the present invention, by analyzing foreground objects that appearing in continuous surveillance images of a surveillance video, behavior data of foreground objects are obtained.

Figure 3:
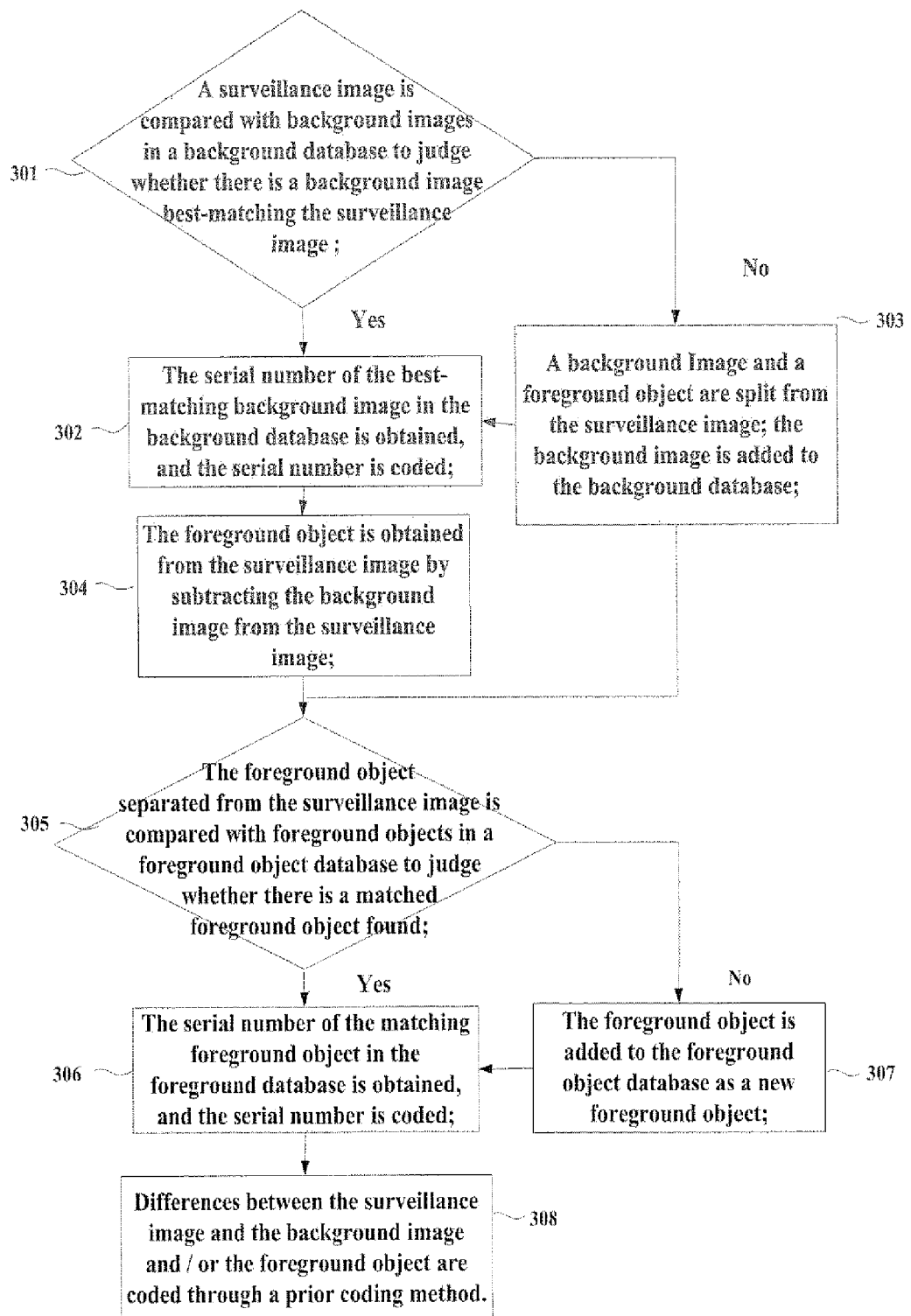
FIG. 3 illustrates a flow chart of a method for coding surveillance videos.

FIG. 3 illustrates a flow chart of a method for coding surveillance videos. As shown in FIG. 3, the method includes:

Step 301: a surveillance image is compared with background images in a background database to judge whether there is a background image best-matching the surveillance image in the background database; if there is, continue with Step 302; or, continue with Step 303.

In an embodiment of the present invention, "comparing a surveillance image with background images in a background database" may be achieved through a SAD algorithm. Specifically, the sum of absolute values of differences between two corresponding pixels of the surveillance image and each background image is calculated, and the background image corresponding to the smallest sum is considered as the best-matching background image.

Step 302: the serial number of the best-matching background image in the background database is obtained, and the serial number is coded. Specifically, the best-matching background image is considered as the specific background image of the surveillance image, and only the serial number that represents the specific background image is coded. Then continue with Step 304.

Step 303: a background image and a foreground object are separated from the surveillance image; the background image is added to the background database and then execute Step 302.

Step 304: the foreground object is extracted from the surveillance image by subtracting its background image from the surveillance image; then continue with Step 305.

Step 305: the foreground object separated or extracted from the surveillance image is compared with foreground objects in a foreground object database to judge whether there is a matched foreground object in the foreground object database; if there is, continue with Step 306; or, continue with Step 307.

Step 306: the serial number of the matched foreground object in the foreground database is obtained, and then the serial number is coded. i.e., only the serial number that represents the certain foreground object is coded. Then continue with Step 308.

Step 307: the foreground object is added to the foreground object database as a new foreground object; at the same time, execute Step 306.

Step 308: residuals (differences) between the surveillance image and the background image and/or the foreground object are coded through a prior coding method. Of course, in some cases, the surveillance image may not have a corresponding background image and/or a foreground object.

Each surveillance image of a surveillance video is sequentially coded, and then a whole video stream is obtained by combining the codes of all the surveillance frame images. Finally, the video stream includes following parts: reference information of the background image, reference information of the foreground object and coding stream of the residuals.

The background database and the foreground object database, or cited background image and foreground object, are respectively coded as independent video streams, and are sent to a decoding side; the coding side and the decoding side should represent and use the two databases in the same way.

In an embodiment of the present invention, during the coding process, higher coded stream may be allocated to the foreground object and/or the foreground object database, in order to get a clearer foreground object at a recognizing side, and finally to achieve higher recognizing performance with subsequent recognizing algorithms. In an embodiment of the present invention, the foreground object may be coded by using smaller quantization parameter (QP) and only intra coding is used.

Figure 4:
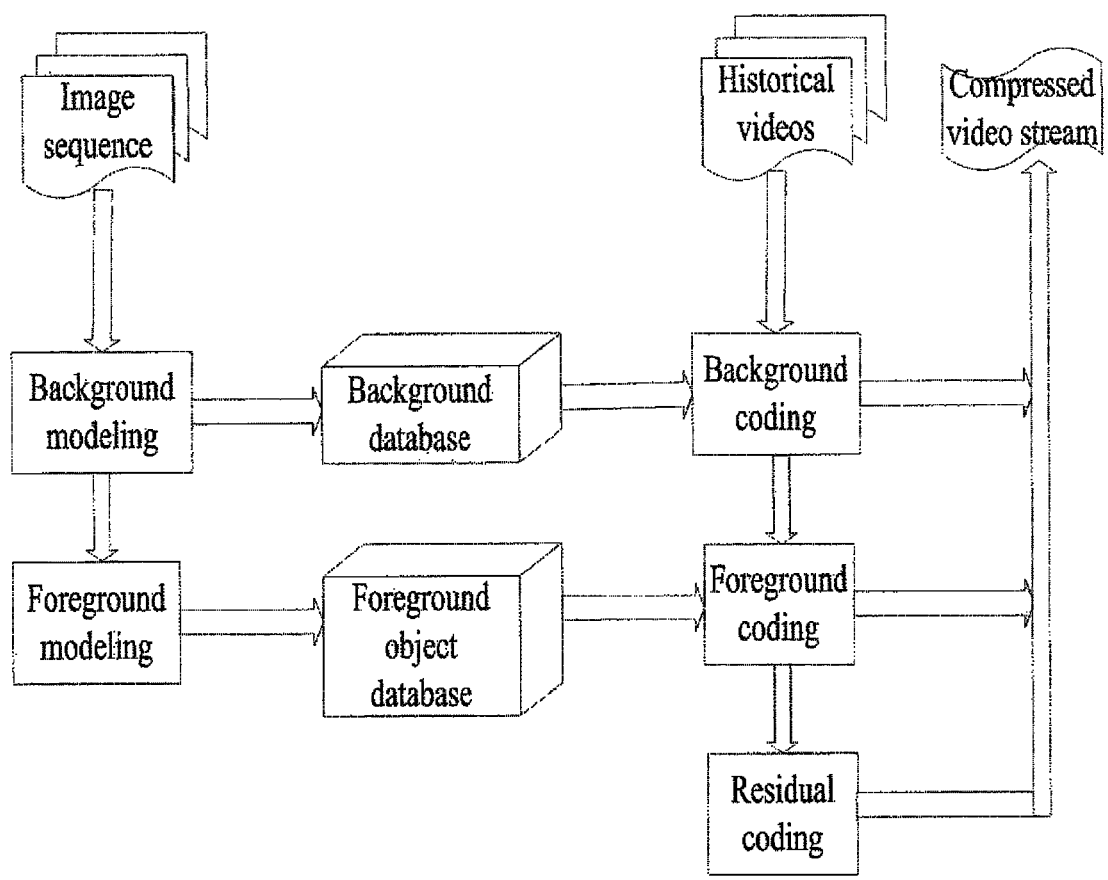
FIG. 4 illustrates a flow chart of a principle of a method for coding surveillance videos.

FIG. 4 illustrates a flow chart of a principle of a method for coding surveillance videos. As shown in FIG. 4, the structure of a compressed video stream, obtained through a video coding method based on scene modeling includes "background description+foreground description+residuals". The left part of FIG. 4 illustrates a scene modeling process, which is actually a process of constantly updating a background database and a foreground object database by learning historical videos; the right part of FIG. 4 illustrates a video coding process, which includes comparing the current image of the video with the background database and the foreground object database; using index description including only a few bits of "background description" and "foreground description" to describe the background image and foreground object if they are included in the background database and the foreground object database; compressing the residuals which cannot be described with reference to the databases, by a traditional coding standard. Of course, the reason for separating scene modeling process and the video coding process is to show the theory. Practically the two processes are integrated as one process, i.e., a visual object which is not included in the current database would be sent to a statistical learning module, and finally may affect the updating of the databases.

FIG. 5 illustrates a flow chart of a method for recognizing surveillance videos. The method is used to decode and recognize a video stream generated in above embodiments. A decoding and recognizing side should have a background database and a foreground object database, both of which are same with those at the coding side, or at least have the background image and foreground object cited by the video stream. As shown in FIG. 5, the method includes:

Step 501: the background database and foreground object database are respectively decoded, or the background image and foreground object cited by a surveillance image are decoded.

Step 502: the surveillance image is decoded by referring to the decoded background image and foreground object cited.

Step 503: description information of the background image, foreground object and behavior data of the foreground object is retrieved from the decoding process, and substituted into a preset semantic expression format to form a semantic expression. The semantic expression format may be "<foreground object> <behavior data> in <background information>".

For example, description information of the background of a decoded image is "snowy playground", description information of the foreground object is "people", description, information of the "behavior data" is "play a ball", and then the semantic expression is finally identified as "people play a ball on the snowy playground".

In another embodiment of the present invention, at the recognizing side, a recognizing algorithm for subtracting a background image from a surveillance image may be used to obtain a foreground object. In this case, completely decoding is not required. Foreground objects of the video stream can be extracted directly and then be provided to following analysis and behavior detection processes for video.

In an embodiment of the present invention, indexes and abstracts of videos are established based on a background database and a foreground object database to achieve efficient organization, access and storage of large-scale surveillance video data.

FIG. 6 illustrates a flow chart of a method for searching indexes of videos. As shown in FIG. 6, the method includes:

Step 601: low-level features and semantic information are effectively expressed and described, wherein, a basic index object includes space-time diagrams, elements and events or objects extracted.

Step 602: a video abstract is generated. In an embodiment of the present invention, the video abstract is generated according to a measure method based on the importance of video clips.

Step 603: a description framework of the index layer is established. All the description information is constructed into syntactic structures of different levels of the video stream. Monitoring information may be rapidly obtained from a compressed video stream, or be obtained through a rapid analysis process.

A system for coding surveillance videos provided by the present invention includes:

a database establishing module, adapted to establish a background database and a foreground object database; wherein, the background database includes a set of background images; the foreground object database includes a set of foreground objects;

a coding module, adapted to code a surveillance image by referring to a background image in the background database and a foreground object in the foreground object database.

The database establishing module may be farther adapted to compare a surveillance image with background images in the background database to obtain a best-matching background image of the surveillance image; to substrate the best-matching background image from the surveillance image to obtain a foreground object, and send the obtained foreground object to a learning module of the foreground object database to judge whether the obtained foreground object has already existed in the foreground object database; to add the foreground object to the foreground object database when the obtained foreground object has not existed in the foreground object database.

The database establishing module may be further adapted to model a background image through a background modeling method if there is no background image best-matching the surveillance image found in the background database; and add the background image modeled into the background image database.

The database establishing module may be further adapted to calculate similarity values between the surveillance image and each background image in the background database; consider the background image corresponding to the largest similarity value as the best-matching background image if the ratio of the largest similarity value to the second largest similarity value is larger than a threshold.

The database establishing module may be further adapted to set different capturing periods, capture background images in different capturing periods, and add the captured images to the background database.

The database establishing module may be further adapted to model background images captured from different angles and add these background images to the background database.

The database establishing module may be further adapted to combine background images captured from different angles to form a panoramic image and add the panoramic image to the background database as a panoramic background image.

The database establishing module may be further adapted to identify the background images by parameters which represent various scenes.

The database establishing module may be further adapted to capture background images of a certain scene at different time and/or in different seasons and/or in different weathers and/or from different capturing angles.

The coding module may be further adapted to compare the surveillance image with background images in the background database and foreground objects in the foreground object database to obtain the best-matching background image and foreground object of the surveillance image; to code the surveillance image by referring to the best-matching background image and foreground object of the surveillance image.

The coding module may be further adapted to obtain the serial number of the best-matching background image in the background database, obtain the serial number of the best-matching foreground object in the foreground object database, and code the serial numbers of the best-matching background image and the foreground object instead.

The coding module may be further adapted to code the background database and the foreground object database.

The coding module may be further adapted to code differences between the surveillance image and the best-matching background image and the foreground object.

The coding module may be further adapted to obtain behavior data of foreground objects by analyzing foreground objects continuously appearing in continuous Surveillance images.

The coding module may be further adapted to allocate higher coded stream to the foreground object database and the foreground object than the background database and/or the background object.

A system for recognizing surveillance videos is provided by an embodiment of the present invention, the system includes:

a decoding module, adapted to decode a video stream, wherein, the video stream includes the surveillance images obtained through the coding method in the embodiment of the present invention.

The decoding method used by the decoding module includes:

decoding a background database and a foreground object database, or decoding a background image and a foreground object cited by a surveillance image.

decoding the surveillance image by referring to the decoded background image and foreground object cited.

The decoding module may be further adapted to obtain description information of "background image" and "foreground object" from the decoded video stream, and substitute the description information of the "background image" and "foreground object" into a preset semantic expression format to form a semantic expression.

The decoding module may be further adapted to obtain description information of "behavior data" from the decoded video stream, and substitute the description information of the "behavior data" into a preset semantic expression format to form a semantic expression.

The decoding module may be further adapted to support the semantic expression format which is "<foreground object> <behavior data> in <background information>".

The above embodiments are only preferred embodiments of the present invention and cannot be used to limit the protection scope of the present invention. Those skilled in the art can understand that, the technical scheme of the embodiment may still be modified or partly equivalently substituted; and the modification or substitution should be considered within the spirit and protection scope of the present invention.

The invention claimed is:

1. A method for coding surveillance videos, comprising:
   establishing a background database and a foreground object database; wherein, the background database comprises a set of background images; the foreground object database comprises a set of foreground objects;
   comparing a surveillance image with background images in the background database and foreground objects in the foreground object database to obtain a best-matching background image and a best-matching foreground object of the surveillance image; and
   coding a serial number that represents the best-matching background image and a serial number that represents the best-matching foreground object, the two coded serial numbers being used as parts of a video stream finally obtained to respectively carrying reference information of the best-matching background image in the background database and reference information of the best-matching foreground object in the foreground object database; and
   coding differences between the surveillance image and the best-matching background image and/or differences between the surveillance image the best-matching foreground object to form a coding stream of differences as a part of the video stream finally obtained.

2. The method of claim 1, wherein, establishing a background database comprises:
   comparing the surveillance image with background images in the background database;
   modeling a background image through a background modeling method if there is no background image best-matching the surveillance image found in the background database,
   adding the background image modeled into the background image database.

3. The method of claim 1, wherein, establishing a foreground object database comprises:
   comparing the surveillance image with background images in the background database to obtain the background image of the surveillance image; subtracting the background image of the surveillance image from the surveillance image to obtain a foreground object; and
   sending to the foreground object to the foreground object database.

4. The method of claim 3, before sending to the foreground object to the foreground object database, further comprising:
   sending to the foreground object to a learning module of the foreground object database to judge whether the obtained foreground object has already existed in the foreground object database;
   adding the foreground object to the foreground object database if the obtained foreground object has not already existed in the foreground object database.

5. The method of claim 2, wherein, background image best-matching the surveillance image is determined by:
   calculating similarity values between the surveillance image with each background image in the background database;
   when the ratio of the largest similarity value to the second largest similarity value is larger than a threshold, considering the background image corresponding to the largest similarity value as the best-matching background image.

6. The method of claim 1, wherein, establishing a background database and a foreground object database comprises:
   setting different capturing periods;
   capturing background images in the different capturing periods and
   adding the captured images to the background database.

7. The method of claim 1, wherein, establishing a background database and a foreground object database comprises:
   capturing background images established from different angles and adding these background images to the background database.

8. The method of claim 1, wherein, establishing a background database and a foreground object database comprises:
   combining background images captured from different angles to form a panoramic background image and
   adding the panoramic background image to the background database.

9. The method of claim 1, wherein, the background database comprises background images under various scenes; and the scenes are identified as parameters of the background images.

10. The method of claim 1, wherein, the background database comprises background images of a certain scene which are captured at any one or combination of different time, different seasons, different weathers and different capturing angles.

11. The method of claim 1, further comprising:
    coding the background database and the foreground object database.

12. The method of claim 1, further comprising:
    obtaining behavior data of foreground objects by analyzing foreground objects appearing in continuous surveillance images.

13. The method of claim 1, further comprising:
    allocating higher coded stream to the foreground object database or the foreground object than the background database or the background image.

14. A method for recognizing surveillance videos, comprising:
    decoding a background image and a foreground object by referring to a serial number that represents the background image and a serial number that represents the foreground object cited by a surveillance image;
    decoding a coding stream of differences to get differences between the surveillance image and the best-matching background image and/or differences between the surveillance image the best-matching foreground object;
    decoding the surveillance image by referring to the decoded background image, the foreground object cited, and the differences between the surveillance image and the best-matching background image and/or the differences between the surveillance image the best-matching foreground object.

15. The method of claim 14, further comprising:
    obtaining description information of the background image and foreground object from the decoded surveillance image;

substituting the description information of the background image and foreground object into a preset semantic expression format to form a semantic expression.

16. The method of claim 15, further comprising:
obtaining description information of behavior data of the foreground object from the decoded surveillance image;
substituting description information of behavior data into the preset semantic expression format to form another semantic expression.

* * * * *